(12) United States Patent
Tian

(10) Patent No.: US 10,327,031 B2
(45) Date of Patent: Jun. 18, 2019

(54) PLAYING CONTROL METHOD AND TERMINAL

(71) Applicants: SHENZHEN SKYWORTH DIGITAL TECHNOLOGY CO., LTD, Shenzhen (CN); SHENZHEN SKYWORTH SOFTWARE CO., LTD, Shenzhen (CN)

(72) Inventor: Chao Tian, Shenzhen (CN)

(73) Assignees: SHENZHEN SKYWORTH DIGITAL TECHNOLOGY CO., LTD, Shenzhen (CN); SHENZHEN SKYWORTH SOFTWARE CO., LTD, Shenzhen (CN)

( * ) Notice: Subject to any disclaimer, the term of this patent is extended or adjusted under 35 U.S.C. 154(b) by 109 days.

(21) Appl. No.: 15/521,720

(22) PCT Filed: Mar. 6, 2015

(86) PCT No.: PCT/CN2015/073732
§ 371 (c)(1),
(2) Date: Apr. 25, 2017

(87) PCT Pub. No.: WO2016/074380
PCT Pub. Date: May 19, 2016

(65) Prior Publication Data
US 2017/0245008 A1    Aug. 24, 2017

(30) Foreign Application Priority Data

Nov. 14, 2014   (CN) .......................... 2014 1 0649782

(51) Int. Cl.
*G06F 1/32*   (2019.01)
*G06F 15/16*  (2006.01)
(Continued)

(52) U.S. Cl.
CPC .......... *H04N 21/4436* (2013.01); *H04N 5/63* (2013.01); *H04N 21/25808* (2013.01); *H04N 21/42204* (2013.01); *H04N 21/6106* (2013.01)

(58) Field of Classification Search
CPC .................................................. H04N 21/4436
See application file for complete search history.

(56) References Cited

U.S. PATENT DOCUMENTS 8,279,058 B2 * 10/2012 Sharma ................. G06F 1/3209
8,793,511 B1 *  7/2014 Bishara .................. G06F 1/266
                                                        713/300

(Continued)

FOREIGN PATENT DOCUMENTS

CN        101175188 A      5/2008
CN        101815195 A      8/2010
(Continued)

OTHER PUBLICATIONS

Extended European search report issued in corresponding European application No. 15859705.4 dated Aug. 1, 2018.

*Primary Examiner* — Mohammed H Rehman
(74) *Attorney, Agent, or Firm* — Fish IP Law, LLP

(57) ABSTRACT

A playing control method and a terminal are provided. The method includes the following. A playing control instruction carrying a device identifier of a playing device is acquired. A content input port and a power output port that are integrated in a control terminal and correspond to the device identifier are opened. Power output ports of the control terminal other than the power output port corresponding to the device identifier and a power output port coupled to a display terminal are closed, multimedia contents via the content input port corresponding to the device identifier are received, and the multimedia contents are transmitted to the display terminal for output and display.

18 Claims, 5 Drawing Sheets

(51) Int. Cl.
*H04N 21/443* (2011.01)
*H04N 5/63* (2006.01)
*H04N 21/258* (2011.01)
*H04N 21/422* (2011.01)
*H04N 21/61* (2011.01)

(56) References Cited

U.S. PATENT DOCUMENTS

2008/0024662 A1 1/2008 Chu
2015/0177814 A1* 6/2015 Bailey .................. G06F 1/3234
713/320

FOREIGN PATENT DOCUMENTS

| | | | |
|---|---|---|---|
| CN | 101902605 | A | 12/2010 |
| CN | 103702192 | A | 4/2014 |
| CN | 103813197 | A | 5/2014 |
| CN | 103813198 | A | 5/2014 |
| EP | 1903795 | A2 | 3/2008 |

* cited by examiner

PLAYING CONTROL METHOD AND TERMINAL

CROSS REFERENCE TO RELATED APPLICATIONS

This application claims priority to Chinese Patent Application No. 201410649782.1, entitled "PLAYING CONTROL METHOD AND TERMINAL", filed on Nov. 14, 2014, content of which is hereby incorporated in its entirety by reference.

TECHNICAL FIELD

The present disclosure relates to communication technical field, and particularly to a playing control method and a terminal.

BACKGROUND

With apparent speed increase of Internet bandwidth, a transition from conventional set top boxes to Internet set top boxes is quick. Various media sources can be widely broadcasted via various channels. Users can select the conventional set top boxes to watch live programs having fine real time, and can also watch wonderful blockbuster movies via a high speed bandwidth Internet, and can also select high definition digital versatile discs (DVDs) to watch high definition programs. Generally, a living room of a family has various playing devices, for example, a digital video broadcasting (DVB) playing device, an over the top (OTT) playing device, a video compact disc (VCD) playing device, a DVD playing device, and so on.

When the above various playing devices are connected to a display terminal of a user, various data connection lines are needed to perform connection. For example, when high definition multimedia interface (HDMI) data transmission lines are used to transmit multimedia contents, to ensure that the user can select to watch multimedia contents provided by a playing device in real time, presently, in a frequently used method, all of the playing devices are opened, and are connected to a display terminal via HDMI output lines. When the display terminal outputs and displays the multimedia contents, all of the playing devices are in a working state. The above playing control method consumes a great deal of power.

SUMMARY

Embodiments of the present disclosure provide a playing control method and a terminal, which can control a power supply state of a playing device in a dynamic time-sharing mode according to a playing control instruction of a user, thus a good energy-saving control effect can be achieved when the user operates multiple playing devices to play contents.

In a first aspect of an embodiment of the present disclosure, a playing control method is disclosed. The method may include: acquiring a playing control instruction carrying a device identifier of a playing device; opening a content input port and a power output port that are integrated in a control terminal and correspond to the device identifier, the content input port being coupled to a content output port of the playing device, and the power output port being coupled to a power input port of the playing device; closing power output ports of the control terminal other than the power output port corresponding to the device identifier and a power output port coupled to a display terminal; and receiving multimedia contents via the content input port corresponding to the device identifier, and transmitting the multimedia contents to the display terminal for output and display.

In a second aspect of the embodiment of the present disclosure, a terminal is disclosed. The terminal may include: an instruction receiving unit, configured to acquire a playing control instruction carrying a device identifier of a playing device; a power supply control unit, configured to open a content input port and a power output port that are integrated in a control terminal and correspond to the device identifier, the content input port being coupled to a content output port of the playing device, and the power output port being coupled to a power input port of the playing device; an outage control unit, configured to close power output ports of the control terminal other than the power output port corresponding to the device identifier and the power output port coupled to a display terminal; and a content transmitting unit, configured to receive multimedia contents via the content input port corresponding to the device identifier, and transmit the multimedia contents to the display terminal for output and display.

In the embodiment of the present disclosure, the playing control instruction carrying the device identifier of the playing device is acquired, the content input port and the power output port that are integrated in the control terminal and correspond to the device identifier are opened, the power output ports of the control terminal other than the power output port corresponding to the device identifier and the power output port coupled to the display terminal are closed, the multimedia contents are received via the content input port corresponding to the device identifier, and the multimedia contents are transmitted to the display terminal for output and display. By implementing the embodiment of the present disclosure, the power supply state of the playing device can be controlled in the dynamic time-sharing mode according to the playing control instruction of the user, thus the good energy-saving control effect can be achieved when the user operates multiple playing devices to play contents.

BRIEF DESCRIPTION OF THE DRAWINGS

To better illustrate the technical solution of embodiments of the present disclosure or the technical solution of the present technology, the following descriptions will briefly illustrate the accompanying drawings described in the embodiments or the present technology. Obviously, the following described accompanying drawings are some embodiments of the present disclosure. Persons skilled in the art can derive other accompanying drawings according to the described accompanying drawings without creative efforts.

DETAILED DESCRIPTION

The technical solutions of embodiments of the present disclosure will be described clearly and completely in combination with the accompanying drawings of the embodiments of the present disclosure. Obviously, the described embodiments are merely a part of embodiments of the present disclosure, and not all of the embodiments. All other embodiments obtained by persons skilled in the art without creative efforts based on the embodiments of the present disclosure shall fall within the protection scope of the present disclosure.

Embodiments of the present disclosure disclose a playing control method and a terminal, and a playing control system and a playing control device, which can control a power supply state of a playing device in a dynamic time-sharing mode according to a playing control instruction of a user, thus a good energy-saving control effect can be achieved when the user operates multiple playing devices to play content. The embodiments will be described in detail below respectively.

Figure 1:
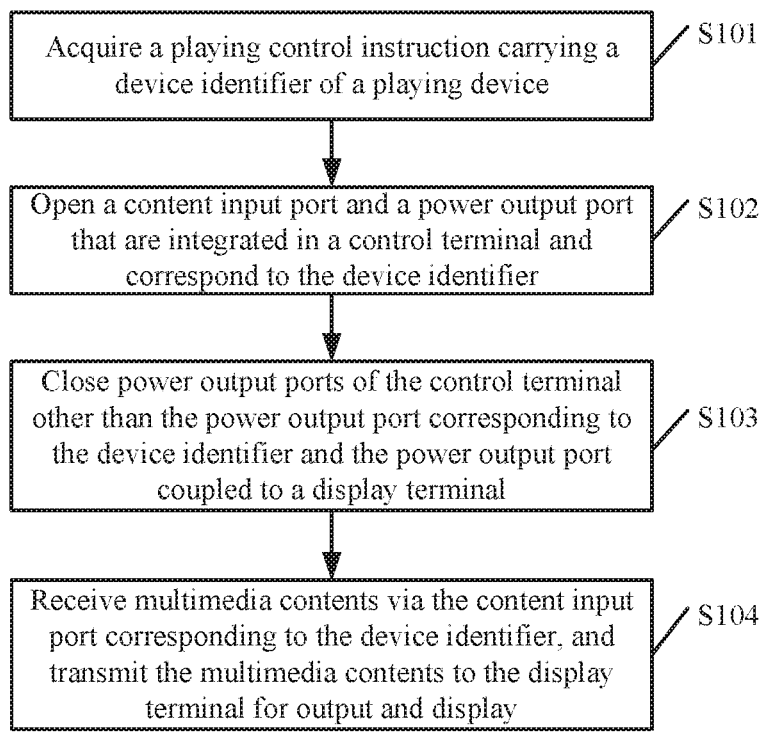
FIG. 1 is a flow chart of a first playing control method in accordance with an embodiment of the present disclosure.

Referring to FIG. 1, FIG. 1 is a flow chart of a first playing control method in accordance with an embodiment of the present disclosure. In the playing control method illustrated by FIG. 1, to realize the control of the playing device in the dynamic time-sharing mode, based on the playing device and a display terminal of the embodiment of the present disclosure, a device is introduced, that is, a control terminal is introduced. What needs to be illustrated is that in the embodiment of the present disclosure, the playing device can be a multimedia content providing device which can provide various multimedia contents, such as a conventional set top box, an internet set top box, a digital video disk (DVD) player, and so on. A content output port and a power input port can be integrated into the playing device. The control terminal can be a fixed or a portable smart terminal. The control terminal not only includes an interface for communicating with the playing device, for example, transmits multimedia contents via a high definition multimedia interface (HDMI), supplies power to the playing device via a standard external power interface, and so on, and the control terminal is also able to communicate with the display terminal, for example, the control terminal can transmit multimedia contents via connecting the content output port to a content input port of the display terminal. The display terminal can be a flat-screen television usually used in families (for example, a plasma color television, a liquid crystal television, or other).

As illustrated by FIG. 1, the playing control method can include the following steps.

Step S101, a playing control instruction carrying a device identifier of the playing device is acquired.

In the embodiment of the present disclosure, the device identifier contained in the playing control instruction is related to the type of the playing device. For example, when the playing device is a digital video broadcasting (DVB) playing device, the device identifier contained in the playing control instruction can be the DVB, and can also be a name entered by the user, for example "video source 1". For example, when the playing device is a DVD player, the device identifier contained in the playing control instruction can be the DVD, and can also be a name entered by the user, for example "local video", and the embodiment of the present disclosure is not limited to the name of the device identifier.

Step S102, the content input port and the power output port that are integrated in the control terminal and correspond to the device identifier are opened. The content input port is coupled to a content output port of the playing device, and the power output port is coupled to a power input port of the playing device.

In the embodiment of the present disclosure, the control device can be coupled to multiple playing devices which can provide various multimedia contents. Content output ports of the multiple playing devices can be coupled to multiple content input ports of the control terminal via data transmission lines. Power input ports of the multiple playing devices can be coupled to multiple power output ports of the control terminal via power lines or data lines having integrated power lines. The control terminal extracts the device identifier information contained in the playing control instruction acquired in step S101, and opens the content input port and the power output port corresponding to the device identifier when it is determined that the playing device corresponding to the identifier information is a device set for providing multimedia contents by the user. The content input port can be a multimedia content interface, for example, a HDMI interface, a video graphics array (VGA) interface, an S terminal interface, a display port, or other. The power output port can be an external power interface, a universal serial bus (USB) power supply interface, or other.

Step S103, power output ports of the control terminal other than the power output port corresponding to the device identifier and a power output port coupled to the display terminal are closed.

In the embodiment of the present disclosure, the control terminal receives an energy-saving control instruction set by the user via a playing interaction interface. At this point, when the control terminal keeps that the power output port corresponding to the device identifier and the power output port coupled to the display terminal are in an open state, user requirements can be satisfied, thus the control terminal closes the power output ports other than the power output port corresponding to the device identifier and the power output port coupled to the display terminal.

For example, it is assumed that three content input interfaces of the control terminal, HDMI1, HDMI2, and HDMI3, are respectively coupled to content output interfaces of the DVB playing device, the DVD playing device, and an over the top (OTT) playing device via high definition video lines. Correspondingly, a power interface 1, a power interface 2, and a power interface 3 of the control terminal are respectively coupled to power input interfaces of the DVB playing device, the DVD playing device, and the OTT playing device. When the user selects the DVB playing device to be the device for providing multimedia contents at current time, after the control terminal receives the energy-saving control instruction set by the user, the control terminal closes the power interface 2 and the power interface 3, whereby electrical connection with the DVD playing device and the OTT playing device is cut off.

Step S104, multimedia contents are received via the content input port corresponding to the device identifier, and the multimedia contents are transmitted to the display terminal for output and display.

In the embodiment of the present disclosure, the control terminal can receive the multimedia contents transmitted by the playing device via the content input port corresponding to the device identifier. The multimedia contents can include multimedia contents, audio resources, and image resources. After the control terminal receives the multimedia contents, the control terminal can transmit the multimedia contents to the display terminal via the content output port of the control terminal. The display terminal can be a flat panel television, a display, or other. After the display terminal receives the multimedia contents transmitted by the control terminal, the display terminal outputs and displays the multimedia contents.

In the method illustrated by FIG. 1, the playing control instruction carrying the device identifier of the playing device is acquired, the content input port and the power output port that are integrated in the control terminal and correspond to the device identifier are opened, the power output ports of the control terminal other than the power output port corresponding to the device identifier and the power output port coupled to the display terminal are closed, the multimedia contents are received via the content input port corresponding to the device identifier, and the multimedia contents are transmitted to the display terminal for playing. By implementing the method illustrated by FIG. 1, the power supply state of the playing device can be controlled in the dynamic time-sharing mode according to the playing control instruction of the user, thus the good energy-saving control effect can be achieved when the user operates multiple playing devices to play contents.

Figure 2:
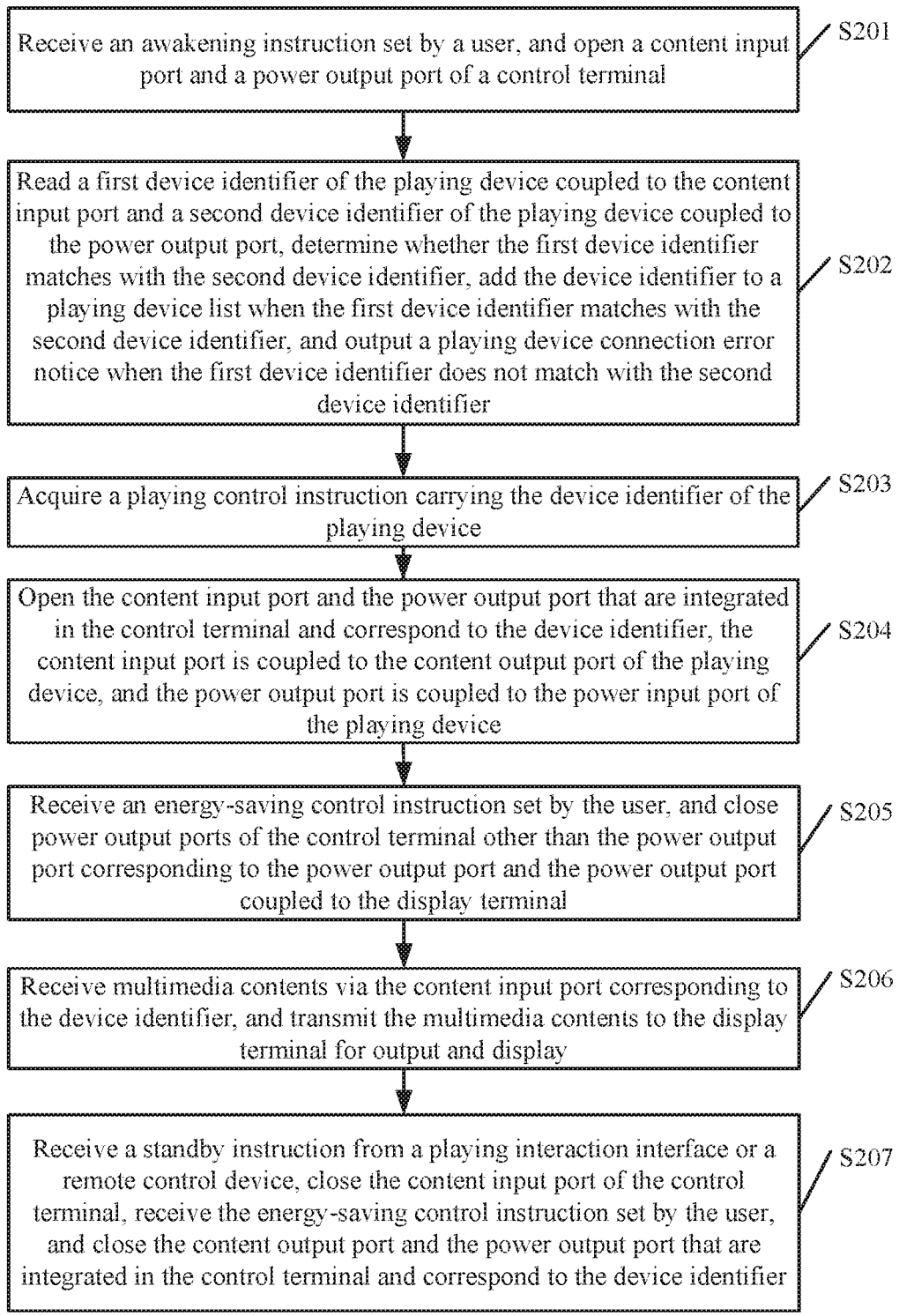
FIG. 2 is a flow chart of a second playing control method in accordance with an embodiment of the present disclosure.

Referring to FIG. 2, FIG. 2 is a flow chart of a second playing control method in accordance with an embodiment of the present disclosure. As illustrated by FIG. 2, the playing control method can include the following steps.

Step S201, an awakening instruction set by a user is received, and the content input port and the power output port of the control terminal are opened.

In the embodiment of the present disclosure, the control terminal can receive the awakening instruction set by the user via a remote control device, and can also receive the awakening instruction via a hardware functional module integrated in a controller of the playing device and having an awakening function (for example, an electric shock switch module having the awakening function, and so on), and the embodiment of the present disclosure is not limited to the specific manner of receiving the awakening instruction set by the user.

Step S202, a first device identifier of the playing device coupled to the content input port and a second device identifier of the playing device coupled to the power output port are acquired, and whether the first device identifier matches with the second device identifier is determined. When the first device identifier matches with the second device identifier, the device identifier is added to a playing device list; when the first device identifier does not match with the second device identifier, a playing device connection error notice is output.

In the embodiment of the present disclosure, after the control terminal receives the awakening instruction set by the user, the first device identifier of the playing device coupled to the content input port and the second device identifier of the playing device coupled to the power output port are acquired, and whether the first device identifier matches with the second device identifier is determined. When the first device identifier matches with the second device identifier, the device identifier is added to the playing device list. The playing device list is configured to store device identifiers of all available playing devices that are acquired by the control terminal. The control terminal can invoke the playing device list and display the playing device list on the playing interaction interface, whereby the user can select the playing device corresponding to one of the device identifiers to be the device for providing multimedia contents at current time. When the first device identifier does not match with the second device identifier, the playing device connection error notice is output, and the connection error notice is configured to inform the user that the connection of the playing device corresponding to the first device identifier, the playing device corresponding to the second device identifier, and the control terminal is required to be reset. A manner in which the notice is output is that the playing device connection error notice is output and displayed via the playing interaction interface, and can also be that display lights of the content input port and the power output port, to which the playing devices whose device identifiers do not match with each other are coupled, are set to continuously flash, whereby the user is informed that there is a control terminal connection error, and the embodiment of the present disclosure is not limited to the manner in which the control terminal outputs the notice.

Step S203, the playing control instruction carrying the device identifier of the playing device is acquired.

In the embodiment of the present disclosure, the step S203 of acquiring the playing control instruction carrying the device identifier of the playing device can include reading a user input operation from the playing interaction interface, and receiving the energy-saving control instruction corresponding to the user input operation.

The control terminal can read a user selection operation from the playing interaction interface, and parse the selection operation to be a corresponding playing control instruction. The playing interaction interface can be run in the control terminal, and can also be run in the display terminal or other mobile terminals, and the playing device corresponding to the device identifier contained in the playing control instruction is set to be the device for providing multimedia contents at current time.

The step S203 of acquiring the playing control instruction carrying the device identifier of the playing device can further include acquiring the energy-saving control instruction transmitted via a remote control device.

The control terminal can acquire the playing control instruction via the remote control device (for example, a remote controller) in a wireless (for example, infrared transmission, and so on) or a wired transmission manner, and select the corresponding playing device to be the device for providing multimedia contents at current time according to the device identifier contained in the playing control instruction.

Step S204, the content input port and the power output port that are integrated in the control terminal and correspond to the device identifier are opened, the content input port is coupled to the content output port of the playing device, and the power output port is coupled to the power input port of the playing device.

In the embodiment of the present disclosure, the port numbers of the content input ports and the power output ports of the control terminal can be set to be one to one. For example, the port numbers of the content input ports of the control terminals are IN1, IN2, IN3, and IN4, the port numbers of the power output ports of the control terminal are OUT1, OUT2, OUT3, and OUT4, and the content input port IN1 and the power output port OUT1 correspond to the same device identifier. After the control terminal receives the playing control instruction acquired in the above step S303, the control terminal instantly opens the content input port and the power output port corresponding to the device identifier.

Step S205, the energy-saving control instruction set by the user is received, the power output ports of the control terminal other than the power output port corresponding to device identifier and the power output port coupled to the display terminal are closed.

In the embodiment of the present disclosure, the step S205 of receiving the energy-saving control instruction set by the user can include reading the user input operation from the playing interaction interface, and receiving the energy-saving control instruction corresponding to the user input operation.

The playing interaction interface can be integrated into the control terminal, or the display terminal, or other terminal (for example, a mobile terminal), and a communication connection can be established between the playing interaction interface and the control terminal, whereby the playing interaction interface can transmit an instruction set by the user (for example, the energy-saving control instruction) in real time.

In another feasible implementation manner, the step S205 of receiving the energy-saving control instruction set by the user can include acquiring the energy-saving control instruction transmitted via the remote control device.

The remote control device can include the remote controller, and transmit the energy-saving control instruction to the control terminal in an infrared transmission mode.

Step S206, multimedia contents are received via the content input port corresponding to the device identifier, and the multimedia contents are transmitted to the display terminal for output and display.

In the embodiment of the present disclosure, the playing device corresponding to the device identifier is already in a working state, and can extract user required program contents in real time from a multimedia content server, and transmit the program contents to the control terminal via the content input port of the playing device. The control terminal receives the above program contents, for example, NBA live video contents, and can transmit the NBA live video contents to the display terminal for output and display via the content output port of the control terminal.

Step S207, a standby instruction from the playing interaction interface or the remote control device is received, the content input port of the control terminal is closed, the energy-saving control instruction set by the user is received, and the content output port and the power output port that are integrated in the control terminal and correspond to the device identifier are closed.

In the embodiment of the present disclosure, the control terminal can acquire the standby instruction set by the user via the playing interaction interface, and can also acquire the standby instruction set by the user via the remote control device in a wireless manner, for example, infrared, Bluetooth, and so on, and close all of the content input ports of the control terminal. The control terminal can further receive the energy-saving control instruction set by the user, and further close the content output port and the power output port corresponding to the device identifier.

In the method illustrated by FIG. 2, the playing control instruction carrying the device identifier of the playing device is acquired, the content input port and the power output port that are integrated in the control terminal and correspond to the device identifier are opened, the energy-saving control instruction set by the user is received, the power output ports of the control terminal other than the power output port corresponding to the device identifier and the power output port coupled to the display terminal are closed, the multimedia contents are received via the content input port corresponding to the device identifier, and the multimedia contents are transmitted to the display terminal for output and display. By implementing the method illustrated by FIG. 2, the power supply state of the playing device can be controlled in the dynamic time-sharing mode according to the playing control instruction of the user, thus the good energy-saving control effect can be achieved when the user operates multiple playing devices to play contents.

Additionally, by implementing the method illustrated by FIG. 2, the control terminal can control a power supply state of the playing device according to the awakening request and standby request of the user, and can further save energy.

Figure 3:
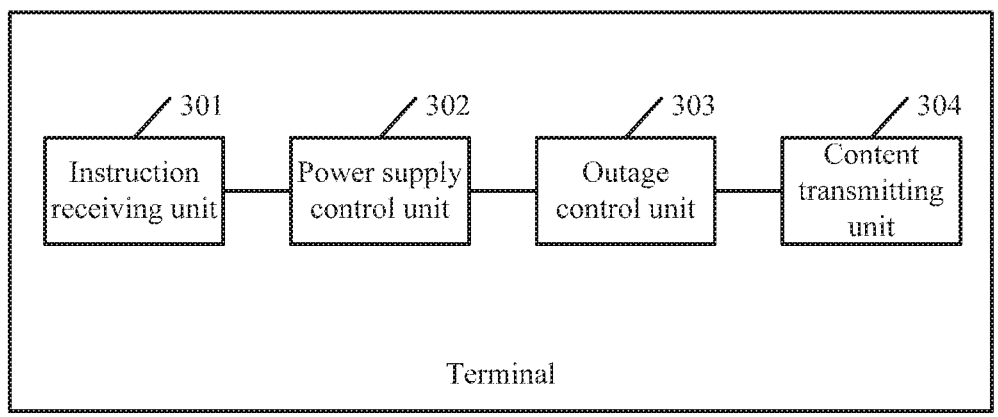
FIG. 3 is a structure view of a first terminal in accordance with an embodiment of the present disclosure.

Referring to FIG. 3, FIG. 3 is a structure view of a first terminal in accordance with an embodiment of the present disclosure, and the terminal is used to realize the playing control method disclosed by the embodiment of the present disclosure. What needs to be illustrated is that the terminal illustrated by FIG. 3 can be a stand-alone device, and is used to execute the playing control method disclosed by the embodiment of the present disclosure, and can be also a newly added part of a display terminal, and is used to execute the playing control method disclosed by the embodiment of the present disclosure. When the terminal illustrated by FIG. 3 that is a stand-alone device or a newly added part of the display terminal is used to execute the playing control method disclosed by the embodiment of the present disclosure, not only a communication connection and an electrical connection relationship can be established between the terminal illustrated by FIG. 3 and a playing device (for example, the communication connection is established via HDMI lines, and the electrical connection is established via an external power interface), but also a communication connection can be established between the terminal illustrated by FIG. 3 and a display terminal (for example, the communication connection with the display terminal is established via Wi-Fi).

As illustrated by FIG. 3, a terminal disclosed by the embodiment of the present disclosure includes the following.

An instruction receiving unit 301 is configured to acquire a playing control instruction carrying a device identifier of the playing device.

In the embodiment of the present disclosure, the device identifier contained in the playing control instruction is related to the type of the playing device. For example, when the playing device is a digital video broadcasting (DVB) playing device, the device identifier contained in the playing control instruction can be the DVB, and can also be a name entered by the user, for example "video source 1". For example, when the playing device is a DVD player, the device identifier contained in the playing control instruction can be the DVD, and can also be a name entered by the user, for example "local video", and the embodiment of the present disclosure is not limited to the name of the device identifier.

A power supply control unit 302 is configured to open a content input port and a power output port that are integrated in a control terminal and correspond to the device identifier. The content input port is coupled to a content output port of the playing device, and the power output port is coupled to a power input port of the playing device.

In the embodiment of the present disclosure, the terminal can be coupled to multiple playing devices which can provide various multimedia contents. Content output ports of the multiple playing devices can be coupled to multiple content input ports of the terminal via data transmission lines. Power input ports of the multiple playing devices can be coupled to multiple power output ports of the terminal via power lines or data lines having integrated power lines. The terminal extracts the device identifier information contained in the playing control instruction acquired in step S101, and opens the content input port and the power output port corresponding to the device identifier when it is determined that the playing device corresponding to the identifier information is a device set for providing multimedia contents by the user. The content input port can be a multimedia content interface, for example, a HDMI interface, a video graphics array (VGA) interface, an S terminal interface, a display port, or other. The power output port can be an external power interface, a universal serial bus (USB) power supply interface, or other.

The outage control unit 303 is configured to close power output ports of the control terminal other than the power output port corresponding to the device identifier and a power output port coupled to the display terminal.

In the embodiment of the present disclosure, the instruction receiving unit 301 receives an energy-saving control instruction set by the user. At this point, when the terminal keeps that the power output port corresponding to the device identifier and the power output port coupled to the display terminal are in an open state, user video viewing requirements can be satisfied, thus the outage control unit 303 closes the power output ports other than the power output port corresponding to the device identifier and the power output port coupled to the display terminal.

For example, it is assumed that three content input interfaces of the terminal, HDMI1, HDMI2, and HDMI3, are respectively coupled to content output interfaces of the DVB playing device, the DVD playing device, and an over the top (OTT) playing device via high definition video lines. Correspondingly, a power interface 1, a power interface 2, and a power interface 3 of the terminal are respectively coupled to power input interfaces of the DVB playing device, the DVD playing device, and the OTT playing device. When the user selects the DVB playing device to be the device for providing multimedia contents at current time, after the instruction receiving unit 301 receives the energy-saving control instruction set by the user, the outage control unit 303 closes the power interface 2 and the power interface 3 of the terminal, whereby electrical connection with the DVD playing device and the OTT playing device is cut off.

A content transmitting unit 304 is configured to receive multimedia contents via the content input port corresponding to the device identifier, and transmit the multimedia contents to the display terminal for output and display.

In the embodiment of the present disclosure, the terminal can receive the multimedia contents transmitted by the playing device via the content input port corresponding to the device identifier. The multimedia contents can include multimedia contents, audio resources, and image resources. After the terminal receives the multimedia contents, the terminal can transmit the multimedia contents to the display terminal via the content output port of the terminal. The display terminal can be a flat panel television, a display, or other. After the display terminal receives the multimedia contents transmitted by the terminal, the display terminal outputs and displays the multimedia contents.

The terminal illustrated by FIG. 3 acquires the playing control instruction carrying the device identifier of the playing device, opens the content input port and the power output port that are integrated in the control terminal and correspond to the device identifier, receives the energy-saving control instruction set by the user, closes the power output ports of the control terminal other than the power output port corresponding to the device identifier and the power output port coupled to the display terminal, receives the multimedia contents via the content input port corresponding to the device identifier, and transmits the multimedia contents to the display terminal for output and display. The terminal illustrated by FIG. 3 can control a power supply state of the playing device in a dynamic time-sharing mode according to the playing control instruction of the user, thus a good energy-saving control effect can be achieved when the user operates multiple playing devices to play contents.

Figure 4:
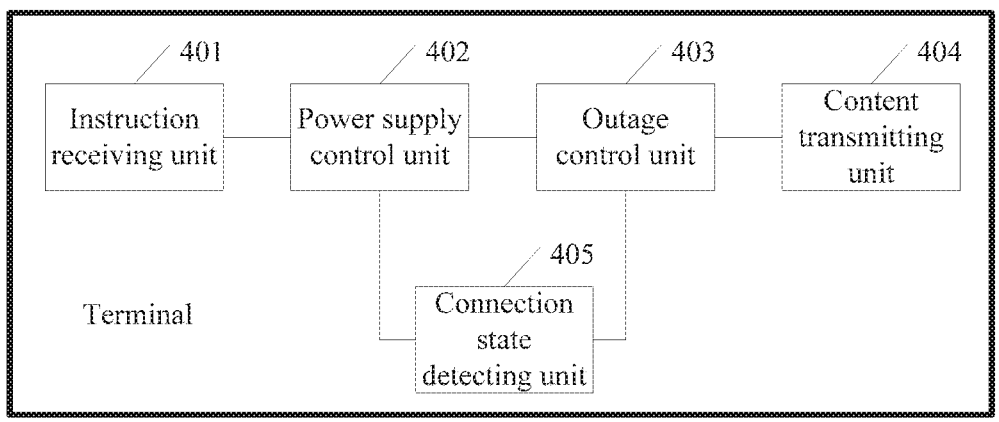
FIG. 4 is a structure view of a second terminal in accordance with an embodiment of the present disclosure.

Referring to FIG. 4, FIG. 4 is a structure view of a second terminal in accordance with an embodiment of the present disclosure, and the terminal is used to realize the playing control method disclosed by the embodiment of the present disclosure. As illustrated by FIG. 4, the terminal disclosed by the embodiment of the present disclosure includes an instruction receiving unit 401 configured to acquire a playing control instruction carrying a device identifier of a playing device.

In the embodiment of the present disclosure, the instruction receiving unit 401 acquiring the playing control instruction carrying the device identifier of the playing device can include that the instruction receiving unit 401 reads a user input operation from a playing interaction interface, and acquires the playing control instruction that corresponds to the user input operation and carries the device identifier of the playing device.

The instruction receiving unit 401 can catch and parse a user selection operation via the playing interaction interface that is integrated in the terminal or a display terminal or other terminal, and further read the playing control instruction set by a user, and sets the playing device corresponding to the device identifier contained in the playing control instruction to be a device for providing multimedia contents at current time.

The instruction receiving unit 401 acquiring the playing control instruction carrying the device identifier of the playing device can further include that the instruction receiving unit 401 acquires the playing control instruction carrying the device identifier transmitted via a remote control device.

The instruction receiving unit 401 can acquire the playing control instruction via the remote control device (for example, a remote controller) in a wireless (for example, infrared transmission, and so on) or a wired transmission manner, and select the corresponding playing device to be the device for providing multimedia contents at current time according to the device identifier contained in the playing control instruction.

A power supply control unit 402 is configured to open a content input port and a power output port that are integrated in a control terminal and correspond to the device identifier after the instruction receiving unit 401 acquires the playing control instruction carrying the device identifier of the playing device. The content input port is coupled to a content output port of the playing device, and the power output port is coupled to a power input port of the playing device.

In the embodiment of the present disclosure, the port numbers of the content input ports and the power output ports of the control terminal can be set to be one to one. For example, the port numbers of the content input ports of the terminal are IN1, IN2, IN3, and IN4, the port numbers of the power output ports of the terminal are OUT1, OUT2, OUT3, and OUT4, and the content input port IN1 and the power output port OUT1 correspond to the same device identifier. After the terminal receives the playing control instruction acquired by the instruction receiving unit 401, the terminal instantly opens the content input port and the power output port corresponding to the device identifier.

The instruction receiving unit 401 is further configured to receive an energy-saving control instruction set by the user after the power supply control unit 402 opens the content input port and the power output port that are integrated in the control terminal and correspond to the device identifier.

An outage control unit 403 is configured to close power output ports of the control terminal other than the power output port corresponding to the device identifier and the power output port coupled to the display terminal after the instruction receiving unit 401 receives the energy-saving control instruction set by the user.

A content transmitting unit 404 is configured to receive multimedia contents via the content input port corresponding to the device identifier, and transmit the multimedia contents to the display terminal for output and display.

A connection state detecting unit 405 is configured to detect a connection state of the content input port and the power output port and update a playing device list according to the connection state after the power supply control unit 402 opens the content input port and the power output port of the control terminal.

In the embodiment of the present disclosure, the connection state detecting unit 405 detecting the connection state of the content input port and the power output port and updating the playing device list according to the connection state includes the following.

The connection state detecting unit 405 reads a first device identifier of the playing device coupled to the content input port and a second device identifier of the playing device coupled to the power output port, determines whether the first device identifier matches with the second device identifier, adds the device identifier to the playing device list when the first device identifier matches with the second device identifier, and outputs a playing device connection error notice when the first device identifier does not match with the second device identifier.

The terminal illustrated by FIG. 4 acquires the playing control instruction carrying the device identifier of the playing device, opens the content input port and the power output port that are integrated in the control terminal and correspond to the device identifier, receives the energy-saving control instruction set by the user, closes the power output ports of the control terminal other than the power output port corresponding to the device identifier and the power output port coupled to the display terminal, receives the multimedia contents via the content input port corresponding to the device identifier, and transmits the multimedia contents to the display terminal for output and display. The terminal illustrated by FIG. 4 can control a power supply state of the playing device in a dynamic time-sharing mode according to the playing control instruction of the user, thus a good energy-saving control effect can be achieved when the user operates multiple playing devices to play contents.

Additionally, the terminal illustrated by FIG. 4 can control power supply states of various ports of the control terminal and a power supply state of the display terminal according to an awakening request and standby request set by the user, and can further save energy.

Figure 5:
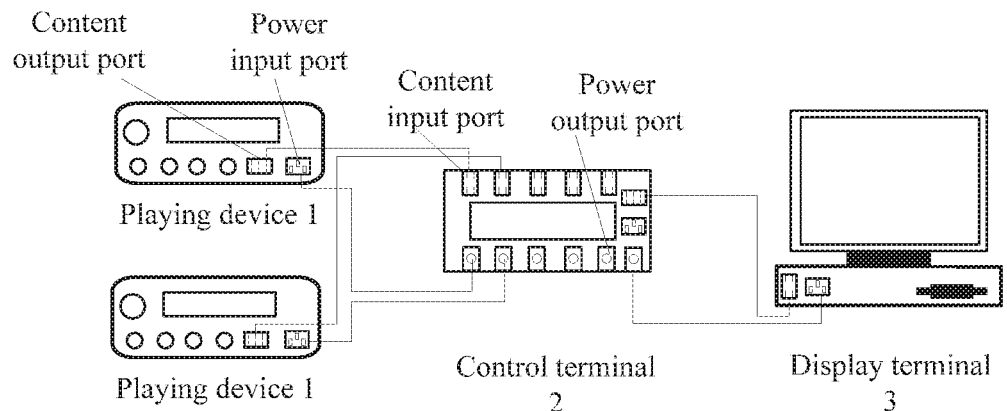
FIG. 5 is a constitution view of a first playing control system in accordance with an embodiment of the present disclosure.

Referring to FIG. 5, FIG. 5 is a structure view of a playing control system in accordance with an embodiment of the present disclosure, and is used to realize the playing control method disclosed by the embodiment of the present disclosure. As illustrated by FIG. 5, the playing control system includes a playing device 1, a control terminal 2, and a display terminal 3. In an implementation manner, a communication connection and an electrical connection can be established between the playing device and the control terminal via an interface (for example, a universal serial bus (USB) interface, an external power interface). A communication connection and an electrical connection can be established between the control terminal and the display terminal via power lines or data lines having integrated power lines. The communication connection can be further established between the control terminal and the display terminal via a network connection (including but not limited to a wireless connection or a wired connection, for example Wi-Fi). The playing control system disclosed by the embodiment of the present disclosure includes the following.

The playing device 1 is configured to couple a content output port of the playing device 1 to a content input port of the control terminal 2, and couple a power input port of the playing device 1 to the power output port of the control terminal 2.

The control terminal 2 is configured to acquire a playing control instruction carrying a device identifier of the playing device 1, open a content input port and a power output port that are integrated in the control terminal 2 and correspond to the device identifier, receive an energy-saving control instruction set by a user, close power output ports of the control terminal 2 other than the power output port corresponding to the device identifier and a power output port coupled to the display terminal, receive multimedia contents via the content input port corresponding to the device identifier, and transmit the multimedia contents to the display terminal 3.

The display terminal 3 is configured to receive and output the multimedia contents transmitted by the control terminal 2.

In an embodiment, before the control terminal 2 receives the energy-saving control instruction set by the user, the control terminal 2 further closes content input ports other than the content input port corresponding to the device identifier.

Figure 6:
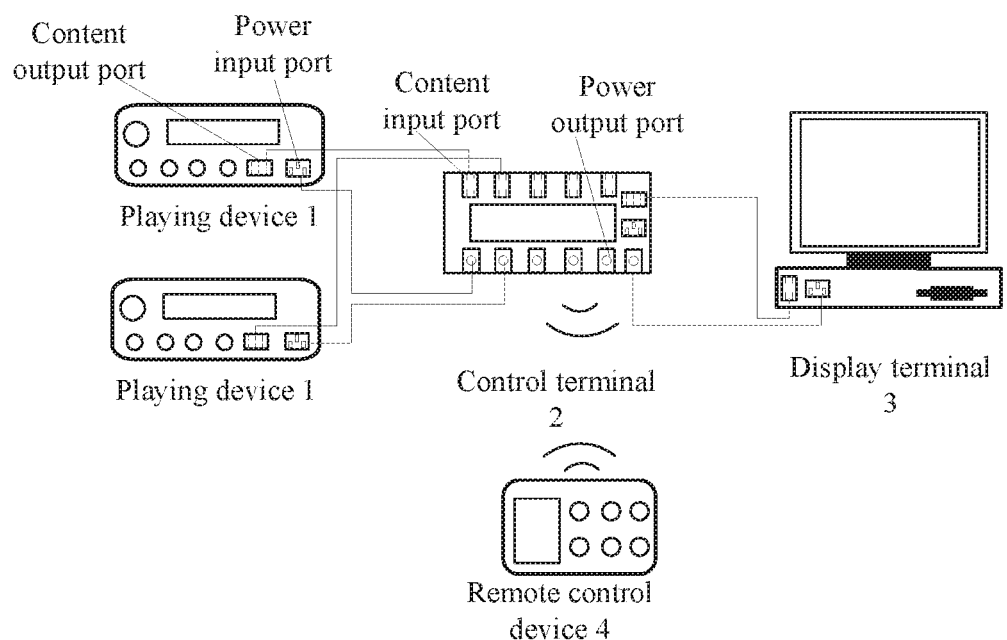
FIG. 6 is a constitution view of a second playing control system in accordance with an embodiment of the present disclosure.

In another embodiment, as illustrated by FIG. 6, the playing control system further includes a remote control device 4.

The remote control device 4 is configured to transmit an awakening instruction to the terminal 2.

The control terminal 2 is further configured to open the content input port and the power output port of the control terminal 2 after receiving the awakening instruction transmitted by the remote control device 4, read a first device identifier of the playing device coupled to the content input port and a second device identifier of the playing device coupled to the power output port, determine whether the first device identifier matches with the second device identifier, add the device identifier to a playing device list when the first device identifier matches with the second device identifier, and output a playing device connection error notice when the first device identifier does not match with the second device identifier.

In yet another embodiment, the control terminal 2 is further configured to receive a standby instruction transmitted by a playing interaction interface or the remote control device 4 and close the content input port of the control terminal 2 after the display terminal 3 receives and outputs the multimedia contents transmitted by the control terminal 2, receive the energy-saving control instruction set by the user, and close the content output port and the power output port that are integrated in the control terminal 2 and correspond to the device identifier.

In yet another embodiment, a manner in which the control terminal acquires the playing control instruction carrying the device identifier is that the control terminal 2 is configured to acquire the playing control instruction that is set by the user and carries the device identifier via the playing interaction interface, or the control terminal 2 is configured to acquire the playing control instruction that is set by the user and carries the device identifier via the remote control device.

In yet another embodiment, the control terminal 2 receiving the energy-saving control instruction set by the user includes that the control terminal 2 is configured to receive the energy-saving control instruction set by the user via the playing interaction interface, or the control terminal 2 is configured to receive the energy-saving control instruction set by the user via the remote control device.

The playing control systems illustrated by FIG. 5 and FIG. 6 acquire the playing control instruction carrying the device identifier of the playing device, open the content input port and the power output port that are integrated in the control terminal and correspond to the device identifier, receive the energy-saving control instruction set by the user, close the power output ports of the control terminal other than the power output port corresponding to the device identifier and the power output port coupled to the display terminal, receive the multimedia contents via the content input port corresponding to the device identifier, and transmit the multimedia contents to the display terminal for output and display. The playing control systems illustrated by FIG. 5 and FIG. 6 can control a power supply state of the playing device in a dynamic time-sharing mode according to the playing control instruction of the user, thus a good energy-saving control effect can be achieved when the user operates multiple playing devices to play contents.

Additionally, the playing control systems illustrated by FIG. 5 and FIG. 6 can control power supply states of various ports of the control terminal and a power supply state of the display terminal according to the awakening request and standby request set by the user, and can further save energy.

Figure 7:
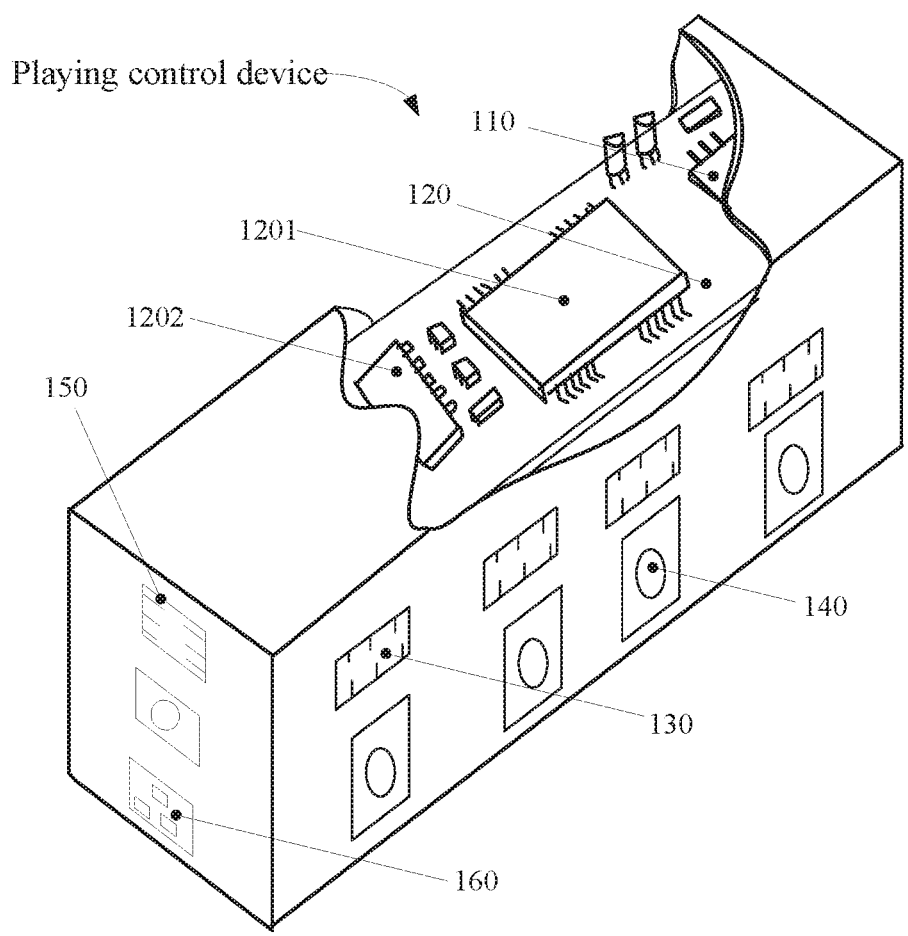
FIG. 7 is a structure view of a playing control device in accordance with an embodiment of the present disclosure.

Referring to FIG. 7, FIG. 7 is a structure view of a playing control device in accordance with an embodiment of the present disclosure. As illustrated by FIG. 7, the playing control device includes a radio frequency module 110, a circuit board 120, multiple content input ports 130, multiple power output ports 140, at least one content output port 150, and a power input port 160. A microcontroller 1201 and a memory 1202 are arranged on the circuit board 120. The radio frequency module 110, the content input port 130, the power output port 140, the content output port 150, and the power input port 160 respectively communicate with the microcontroller 120 via circuits. The microcontroller 1201 communicates with the memory 1202 via a circuit. The circuit board 120 and the radio frequency module 110 are fully received in a single housing. Multiple elements include at least two elements.

The memory 1202 is configured to store program instructions, and the program instructions are used to control a playing device in a dynamic time-sharing mode.

The microcontroller 1201 is configured to invoke the program instructions stored in the memory 1202 to execute the following operations: acquiring a playing control instruction carrying a device identifier of the playing device; and opening the content input port 130 and the power output port 140 that are integrated in a control terminal and correspond to the device identifier. The content input port 130 is coupled to a content output port of the playing device, and the power output port 140 is coupled to a power input port of the playing device. The microcontroller 1201 is further configured to invoke the program instructions stored in the memory 1202 to execute the following operations: receiving an energy-saving control instruction set by a user, closing power output ports 140 of the control terminal other than the power output port 140 corresponding to the device identifier and the power output port 140 coupled to a display terminal; receiving multimedia contents via the content input port 130 corresponding to the device identifier, and transmitting the multimedia contents to the display terminal for output and display.

In an embodiment, the microcontroller 1201 is further configured to close the content input ports 130 of the control terminal other than the content input port 130 corresponding to the device identifier before receiving the energy-saving instruction set by the user.

In an embodiment, the microcontroller 1201 is further configured to receive an awakening instruction set by the user and open the content input port 130 and the power output port 140 of the control terminal before acquiring the playing control instruction carrying the device identifier of the playing device, read a first device identifier of the playing device coupled to the content input port 130 and a second device identifier of the playing device coupled to the power output port 140, determine whether the first device identifier matches with the second device identifier, add the device identifier to a playing device list when the first device identifier matches with the second device identifier, and output a playing device connection error notice when the first device identifier does not match with the second device identifier.

In an embodiment, after the microcontroller 1201 transmits the multimedia contents to the display terminal for playing, the microcontroller 1201 is further configured to receive a standby instruction transmitted by a playing interaction interface or a remote control device, close the content input port 130 of the control terminal, receive the energy-saving control set by the user, and closes the content output port 150 and the power output port 140 that are integrated in the control terminal and correspond to the device identifier.

In an embodiment, the microcontroller 1201 acquiring the playing control instruction of the device identifier includes that the microcontroller 1201 is configured to acquire the playing control instruction that is set by the user and carries the device identifier via the playing interaction interface, or the microcontroller 1201 is configured to acquire the playing control instruction that is set by the user and carries the device identifier via the remote control device.

In an embodiment, the microcontroller 1201 receiving the energy-saving instruction set by the user includes that the microcontroller 1201 is configured to receive the energy-saving control instruction set by the user via the playing interaction interface, or the microcontroller 1201 is config- ured to receive the energy-saving control instruction set by the user via the remote control device.

The playing control device illustrated by FIG. 7 acquires the playing control instruction carrying the device identifier of the playing device, opens the content input port and the power output port that are integrated in the control terminal and correspond to the device identifier, receives the energy-saving control instruction set by the user, closes the power output ports of the control terminal other than the power output port corresponding to the device identifier and the power output port coupled to the display terminal, receives the multimedia contents via the content input port corresponding to the device identifier, and transmits the multimedia contents to the display terminal for playing. The playing control device illustrated by FIG. 7 can control the power supply state of the playing device in the dynamic time-sharing mode according to the playing control instruction of the user, thus a good energy-saving control effect can be achieved when the user operates multiple playing devices to play contents.

Additionally, the playing control device illustrated by FIG. 7 can control power supply states of various ports of the control terminal and a power supply state of the display terminal according to the awakening request and standby request of the user, and can further save energy.

The modules or sub-modules of all embodiments of the present disclosure can be realized by a universal integrated circuit, for example, a central processing unit (CPU), or an application specific integrated circuit (ASIC).

According to actual needs, the order of the steps of the methods in the embodiments of the present disclosure can be adjusted, some steps can be merged into one step, and some step can be deleted.

According to actual needs, some units of the terminals in the embodiments of the present disclosure can be merged into one unit, some unit can be divided into several units, and some unit can be deleted.

Those skilled in the art can understand that all or a part of procedures can be accomplished by using a program to instruct related hardware. The program can be stored in a computer-readable storage medium. The storage medium can be a flash memory, a ROM (Read-Only Memory, ROM), a RAM (Random Access Memory, RAM), a magnetic disk, an optical disk, or the like.

The embodiments described above are merely preferred ones of the present disclosure but are not limitations to the protection scope of the present disclosure, thus equivalent variations made according to the appended claims of the present disclosure still fall within the scope of the present disclosure.

What is claimed is:

1. A playing control method, comprising:
   acquiring a playing control instruction carrying a device identifier of a playing device;
   closing power output ports of a control terminal other than a power output port that is integrated in the control terminal and corresponding to the device identifier and a power output port coupled to a display terminal, the power output port corresponding to the device identifier being coupled to a power input port of the playing device; and
   receiving multimedia contents via a content input port corresponding to the device identifier, and transmitting the multimedia contents to the display terminal for output and display;
   wherein before acquiring the playing control instruction carrying the device identifier of the playing device, the method further comprises:
   opening, when an wakening instruction is received, all content input ports of the control terminal and all power output ports of the control terminal to determine whether each content input port and a corresponding power output port are coupled to the same playing device, the content input ports and the power output ports of the control terminal being in a one-to-one correspondence; and
   setting, when one content input port and the corresponding power output port are coupled to the same playing device, a device identifier of the playing device coupled to the one content input port to be selectable for a user.

2. The method of claim 1, wherein before closing the power output ports of the control terminal other than the power output port corresponding to the device identifier and the power output port coupled to the display terminal, the method further comprises:
   receiving an energy-saving control instruction.

3. The method of claim 2, wherein before receiving the energy-saving control instruction, the method further comprises:
   closing content input ports of the control terminal other than the content input port corresponding to the device identifier.

4. The method of claim 2, wherein receiving the energy-saving control instruction comprises one of the following:
   reading a user input operation from a playing interaction interface, and receiving the energy-saving control instruction corresponding to the user input operation; and
   acquiring the energy-saving control instruction transmitted via a remote control device.

5. The method of claim 1, further comprising:
   outputting, when one content input port and the corresponding power output port fail to be coupled to the same playing device, a playing device connection error notice.

6. The method of claim 1, wherein after transmitting the multimedia contents to the display terminal for playing, the method further comprises:
   receiving a standby instruction, and closing the content input ports of the control terminal; and
   closing the content output port and the power output port that are integrated in the control terminal and correspond to the device identifier.

7. The method of claim 6, wherein before closing the content output port and the power output port that are integrated in the control terminal and correspond to the device identifier, the method further comprises:
   receiving an energy-saving control instruction.

8. The method of claim 7, wherein receiving the energy-saving control instruction comprises one of the following:
   reading a user input operation from a playing interaction interface, and receiving the energy-saving control instruction corresponding to the user input operation; and
   acquiring the energy-saving control instruction transmitted via a remote control device.

9. The method of claim 1, wherein acquiring the playing control instruction carrying the device identifier comprises one of the following:
   reading a user input operation from a playing interaction interface, and acquiring the playing control instruction that corresponds to the user input operation and carries the device identifier; and
   acquiring the playing control instruction that is transmitted via a remote control device and carries the device identifier.

10. A terminal comprising:
    an instruction receiving unit, configured to acquire a playing control instruction carrying a device identifier of a playing device;
    an outage control unit, configured to close power output ports of a control terminal other than a power output port that is integrated in the control terminal and corresponding to the device identifier and the power output port coupled to a display terminal, the power output port corresponding to the device identifier being coupled to a power input port of the playing device; and a content transmitting unit, configured to receive multimedia contents via a content input port corresponding to the device identifier, and transmit the multimedia contents to the display terminal for output and display;

the instruction receiving unit is further configured to receive an awakening instruction;

the terminal further comprises:

a power supply control unit further configured to open all content input ports of the control terminal and all power output ports of the control terminal when the instruction receiving unit receives the awakening instruction; and a connection state detecting unit configured to determine whether each content input and a corresponding power output port are coupled to the same playing device when the power supply control unit opens all the content input ports and all the power output ports of the control terminal, and set, when one content input port and the corresponding power output port are coupled to the same playing device, a device identifier of the playing device coupled to the one content input port to be selectable for a user, the content input ports and the power output ports of the control terminal being in a one-to-one correspondence.

11. The terminal of claim 10, wherein the instruction receiving unit is further configured to receive an energy-saving control instruction before the outage control unit closes the power output ports of the control terminal other than the power output port corresponding to the device identifier and the power output port coupled to the display terminal.

12. The terminal of claim 11, wherein the outage control unit is further configured to close content input ports of the control terminal other than the content input port corresponding to the device identifier before the instruction receiving unit receives the energy-saving control instruction set by the user.

13. The terminal of claim 10, wherein the connection state detecting unit is further configured to output a playing device connection error notice when one content input port and the corresponding power output port fail to be coupled to the same playing device.

14. The terminal of claim 11, wherein the instruction receiving unit receiving the energy-saving control instruction comprises one of the following:

the instruction receiving unit configured to read a user input operation from a playing interaction interface, and receive the energy-saving control instruction corresponding to the user input operation; and the instruction receiving unit configured to acquire the energy-saving control instruction transmitted via a remote control device.

15. The terminal of claim 10, wherein the instruction receiving unit is further configured to receive a standby instruction set after the content transmitting unit transmits the multimedia contents to the display terminal for playing;

the outage control unit is further configured to close the content input ports of the control terminal after the instruction receiving unit receives the standby instruction, and close the content output port and the power output port that are integrated in the control terminal and correspond to the device identifier.

16. The terminal of claim 15, wherein the instruction receiving unit is further configured to receive an energy-saving control instruction before the outage control unit closes the content output port and the power output port that are integrated in the control terminal and correspond to the device identifier.

17. The terminal of claim 16, wherein the instruction receiving unit receiving the energy-saving control instruction comprises one of the following:

the instruction receiving unit configured to read a user input operation from a playing interaction interface, and receive the energy-saving control instruction corresponding to the user input operation; and the instruction receiving unit configured to acquire the energy-saving control instruction transmitted via a remote control device.

18. The terminal of claim 10, wherein the instruction receiving unit acquiring the playing control instruction carrying the device identifier comprises one of the following:

the instruction receiving unit configured to read a user input operation from a playing interaction interface, and acquire the playing control instruction that corresponds to the user input operation and carries the device identifier; and the instruction receiving unit configured to acquire the playing control instruction that is transmitted via a remote control device and carries the device identifier.

* * * * *